United States Patent
Roessl et al.

(10) Patent No.: US 12,313,794 B2
(45) Date of Patent: May 27, 2025

(54) COMPENSATION OF POLARIZATION EFFECTS IN PHOTON COUNTING DETECTORS

(71) Applicant: KONINKLIJKE PHILIPS N.V., Eindhoven (NL)

(72) Inventors: Ewald Roessl, Ellarau (DE); Roger Steadman Booker, Aachen (DE)

(73) Assignee: KONINKLIJKE PHILIPS N.V., Eindhoven (NL)

(*) Notice: Subject to any disclaimer, the term of this patent is extended or adjusted under 35 U.S.C. 154(b) by 358 days.

(21) Appl. No.: 17/788,343

(22) PCT Filed: Dec. 15, 2020

(86) PCT No.: PCT/EP2020/086104
§ 371 (c)(1),
(2) Date: Jun. 23, 2022

(87) PCT Pub. No.: WO2021/130053
PCT Pub. Date: Jul. 1, 2021

(65) Prior Publication Data
US 2023/0024679 A1 Jan. 26, 2023

(30) Foreign Application Priority Data
Dec. 27, 2019 (EP) .................................. 19219865

(51) Int. Cl.
*G01T 1/17* (2006.01)
*G01T 1/24* (2006.01)

(52) U.S. Cl.
CPC .............. *G01T 1/171* (2013.01); *G01T 1/247* (2013.01)

(58) Field of Classification Search
CPC G01T 1/171; G01T 1/247; G01T 1/24; G01T 1/2985; G01T 1/17
See application file for complete search history.

(56) References Cited

U.S. PATENT DOCUMENTS 7,208,739 B1 4/2007 Yanoff
8,723,132 B2 5/2014 Baeumer
(Continued)

FOREIGN PATENT DOCUMENTS

EP 2866663 A1 5/2015
EP 3567405 A1 11/2019
(Continued)

OTHER PUBLICATIONS

PCT International Search Report, International application No. PCT/EP2020/086104, Feb. 24, 2021.
(Continued)

*Primary Examiner* — Blake C Riddick
(74) *Attorney, Agent, or Firm* — Larry Liberchuk

(57) ABSTRACT

The present invention relates to a system (100) and a method for correcting a number of counts (115) in an energy bin of X-ray photons detected by a photon counting detector (111) for a spectral computed tomography system (300). An illumination history (125) of the photon counting detector is taken into account to determine a gain and/or an offset of the photon counting detector. The number of counts in an energy bin of detected photons is corrected according to a correction value (135) corresponding to the determined gain and/or offset.

9 Claims, 3 Drawing Sheets

(56) References Cited

U.S. PATENT DOCUMENTS

| | | |
|---|---|---|
| 9,759,822 B2 | 9/2017 | Daerr |
| 10,292,668 B2 | 5/2019 | Konno |
| 10,827,992 B2 | 11/2020 | Jin |
| 10,980,506 B2 | 4/2021 | Roessl |
| 11,002,865 B2 | 5/2021 | Roessl |
| 2008/0260094 A1* | 10/2008 | Carmi .................. A61B 6/4241 378/19 |
| 2009/0039273 A1* | 2/2009 | Tkaczyk ................ G01T 1/247 250/370.06 |
| 2010/0193700 A1* | 8/2010 | Herrmann ............... G01T 1/171 250/336.1 |
| 2010/0215230 A1* | 8/2010 | Bornefalk ............ G01T 1/1663 382/128 |
| 2012/0243660 A1 | 9/2012 | Kappler |
| 2014/0203182 A1* | 7/2014 | Tsukiyama ............. H04N 25/30 250/370.08 |
| 2014/0233693 A1* | 8/2014 | Wang ..................... A61B 6/582 378/207 |
| 2014/0233694 A1* | 8/2014 | Wang ..................... A61B 6/583 378/207 |
| 2014/0328464 A1* | 11/2014 | Proksa ................. G01N 23/046 250/336.1 |
| 2014/0328465 A1* | 11/2014 | Herrmann ............. G01T 1/2985 250/361 R |
| 2015/0063533 A1* | 3/2015 | Proksa ................... G01T 1/171 378/19 |
| 2015/0182176 A1 | 7/2015 | Jin |
| 2015/0243022 A1* | 8/2015 | Petschke ............... G06T 7/0012 382/131 |
| 2015/0316663 A1* | 11/2015 | Herrmann ............... G01T 1/247 382/132 |
| 2016/0033654 A1 | 2/2016 | Tamura |
| 2016/0070008 A1 | 3/2016 | Cao |
| 2016/0131773 A1 | 5/2016 | Cao |
| 2016/0195623 A1 | 7/2016 | Wang |
| 2016/0206255 A1* | 7/2016 | Gagnon .................... G01T 1/00 |
| 2016/0242725 A1* | 8/2016 | Wang .................. A61B 6/4233 |
| 2016/0287205 A1 | 10/2016 | Zou |
| 2016/0377745 A1* | 12/2016 | Daerr ..................... G01T 1/247 250/371 |
| 2017/0100085 A1* | 4/2017 | Roessl .................. A61B 6/482 |
| 2017/0269008 A1* | 9/2017 | Sjolin .................. G01N 23/046 |
| 2018/0177481 A1* | 6/2018 | Jacob ...................... G01T 1/242 |
| 2018/0188391 A1* | 7/2018 | Daerr .................... A61B 6/4241 |
| 2018/0252822 A1* | 9/2018 | Svensson .................. G01T 1/18 |
| 2019/0313993 A1 | 10/2019 | Zhou |
| 2020/0116874 A1* | 4/2020 | Prekas ...................... G21K 1/04 |
| 2020/0371261 A1* | 11/2020 | Maruno ................. H04N 25/46 |
| 2020/0374478 A1* | 11/2020 | Maruno ............... H04N 25/671 |
| 2021/0012543 A1* | 1/2021 | Hein ................. G06T 11/008 |
| 2021/0121143 A1* | 4/2021 | Iniewski ............... A61B 6/585 |
| 2021/0382188 A1* | 12/2021 | Steadman Booker .... G01T 1/17 |
| 2022/0373700 A1* | 11/2022 | Tinti .................... G01T 1/1606 |

FOREIGN PATENT DOCUMENTS

| | | |
|---|---|---|
| WO | WO2014001984 A1 | 1/2014 |
| WO | WO2017046002 A1 | 3/2017 |
| WO | WO2019157435 A1 | 8/2019 |

OTHER PUBLICATIONS

Touch M et al., "A Neural Network-Based Method for Spectral Distortion Correction in Photon Counting X-Ray CT", Physics in Medicine and Biology, vol. 61, pp. 6132-6153, 2016.

* cited by examiner

COMPENSATION OF POLARIZATION EFFECTS IN PHOTON COUNTING DETECTORS

FIELD OF THE INVENTION

The present invention relates to a system for correcting a number of counts in an energy bin of X-ray photons detected by a photon counting detector for a spectral computed tomography system, and a method for correcting a number of counts in an energy bin of X-ray photons detected by a photon counting detector for a spectral computed tomography system.

BACKGROUND OF THE INVENTION

Photon counting detectors count photons impinging on the detector and determine their energy. The photon counting detector provides a signal with a pulse-height, which in first order can be proportional to the energy of the incoming photon. Such a trivial reconstruction of the photon energy can only be applied with relatively low count rates of incoming photons. The high X-ray intensities used, for example, in medical imaging systems like computed tomography result in very high rates of photons impinging onto the detector. These high rates of photons to be detected lead to a saturation of the detector. In case of semiconductor detectors, a polarization of the photon counting detector occurs, which results in a lower signal of the detector and therefore a reduced pulse-height of the signal. This leads to a reduced reconstructed energy of the detected photon and can lead to a classification in a wrong energy bin of the detection system. This effect can cause ring or band artifacts in computed tomography images depending on the dominance of this effect on a pixel level or module/crystal level.

For these reasons, it would be advantageous to have a system and a method for correcting a number of counts in an energy bin of X-ray photons detected by a photon counting detector for a spectral computed tomography system that does not suffer from the above-mentioned drawbacks and can reduce polarization artifacts in photon counting computed tomography image reconstruction.

WO 2017/046002 A1 discloses the correction of photon counts in a photon counting X-ray radiation detection system.

EP 3 567 405 A1 discloses a radiation detector adapted for detecting leakage currents.

US 2012/243660 A1 discloses a method for correcting detector data of an X-ray detector and X-ray recording system.

SUMMARY OF THE INVENTION

It is an object of the present invention to provide a system and a method for correcting a number of counts in an energy bin of X-ray photons detected by a photon counting detector for a spectral computed tomography system that provides a number of counts in an energy bin corresponding to an un-polarized detector.

The object of the present invention is solved by the subject matter of the independent claims, wherein further embodiments are incorporated in the dependent claims.

The described embodiments similarly pertain to the system for correcting a number of counts in an energy bin of X-ray photons detected by a photon counting detector for a spectral computed tomography system, and the method for correcting a number of counts in an energy bin of X-ray photons detected by a photon counting detector for a spectral computed tomography system. Synergistic effects may arise from different combinations of the embodiments although they might not be described in detail.

Further on, it shall be noted that all embodiments of the present invention concerning a method, might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

According to a first aspect of the invention, there is provided a system for correcting a number of counts in an energy bin of X-ray photons detected by a photon counting detector for a spectral computed tomography system. The system comprises a photon detection unit comprising a photon counting detector and configured for detecting photons and providing a pulse-height of each of the detected photons, and a storage device configured for storing a number of counts in an energy bin according to the pulse-height of each of the detected photons. The system further comprises a determination unit configured for determining a correction value of a gain and/or a correction value of an offset of the photon counting detector based on an illumination history of the photon counting detector, and a correction unit configured for correcting the number of counts in the energy bin of the detected photons according to the correction value of the gain and/or the correction value of the offset of the photon counting detector. The correction unit is configured for correcting the number of counts in the energy bin of the detected photons in a forward model of the spectral computed tomography system by adapting a response function of the photon detection unit according to the correction value. The system is configured for correcting deviations of the number of counts in the energy bin, which are due to space charge effects, polarization effects of and/or charge trapping in the photon counting detector.

The photon detection unit comprises a photon counting detector. The photon detection unit can further comprise readout electronics of the photon counting detector like amplifier, shaper, comparators, counters or analog-to-digital converter. This detector can be a semiconductor detector made, for example, from silicon, cadmium zinc telluride, gallium arsenide, germanium or cadmium telluride. The photon can interact with the material of the detector via the photoelectric effect or the Compton Effect. The electron generated in this interaction can deposit its energy in an active region of the photon counting detector, thereby generating charge carriers like electrons and holes. These charge carriers can be accelerated towards the anode and the cathode of the detector, respectively by application of an electric field to the detector. However, the separation of the generated negative and positive charge carriers in the electric field can lead to the buildup of space charge and charge trapping can occur. This can depend on the presence of impurities in the detector material and changes the electric field and thus the response behavior of the photon counting detector with respect to gain and offset of the photon counting detector. With higher X-ray intensities and therefore a high rate of photons to be detected, the response of the photon counting detector can depend on the illumination history of the impinging irradiation. If the X-ray intensity increases, the buildup of space charge and charge trapping in the semiconductor material can lead to changes in the electric field. This causes different responses of the detector to a single detected photon depending on the history of impinging irradiation. The response of the photon counting detector as a result of an energy of an incoming photon can be characterized by a gain and an offset. The gain of the photon counting detector can be a measure for a number of charge carriers collected at the electrodes of the detector in relation to the number of charge carriers generated by the incident photon. Assuming that no permanent radiation damage effects are present in the photon counting detector, after a sufficiently long time where the detector is not exposed to X-ray irradiation, the initial conditions of the electric field within the bulk of the detector will be reestablished. The timescales on which these effects take place can have a multitude of physical origins, leading to a challenging model of this effect. The system according to the invention is based on a correction of the deviation in number of counts of detected photons in an energy bin, thereby obtaining a reproducible response of the detector. The correction is based on the insight of the inventors that the output of the detector at any given moment of its operation can be determined by the incident spectrum, flux and illumination history.

Therefore, the system of the present invention comprises the photon detection unit configured for detecting the photons and providing a pulse-height of the detected photons, and a storage device configured for storing a number of counts in an energy bin according to the pulse-height of each of the detected photons. The system can comprise several energy bins, preferably four or five energy bins, wherein the number of counts in all of the bins is corrected. An illumination history is provided, which can be a record of photons that have been previously detected in the photon counting detector. The illumination history can comprise a flux of photons and a time the photon counting detector is exposed to this flux of photons. The flux of the photons onto a photon counting detector can be dependent of the position of the specific detection element in the computing tomography system and it can be dependent on the projection being measured. The system further comprises a determination unit configured for determining a correction value of a gain and/or an offset of the photon counting detector based on the illumination history. The determination unit takes the preceding photons of the illumination history illuminating the photon detection unit into account and determines a correction value. This correction value can correspond to a decrease or an increase of the gain of the photon detection unit. The correction factor can further correspond to an offset of the pulse-height of the photon detection unit. The offset can be an extrapolation of the detector response with respect to a photon energy resulting in a pulse-height of zero. The system comprises further a correction unit configured for correcting the number of counts in the energy bin of the detected photons according to the correction value. Therefore, the number of counts in the energy bin is corrected to a number of counts that would have been measured in an un-polarized detector.

The photon counting detector can be a detector for a computed tomography system measuring photons with an energy in the energy range of X-rays. Thus, the number of counts in one or more energy bins, preferably four or five bins, is used to derive attenuation coefficient and a material composition of an object to be examined. The number of counts can be directly corrected in the energy bins. However, the number of counts can also be corrected by providing a forward model for the expectation of the value of the number of X-ray photons detected in the energy bin accounting for the polarization state of the detector. The forward model can comprise a relation of the attenuation coefficient and the material composition with the number of counts in the energy bin and the response function of the photon detection unit. By correction the pulse-height of the photons in the response function with the correction value of the gain and/or the offset of the photon counting detector, the material composition can be derived by this indirect correction of the number of counts in the energy bins.

For example, the measured number of counts of the photon counting detector can be used to determine the material composition of an object transmitted by X-rays. In one embodiment of the invention, the measured number of counts is corrected for polarization effects, and then the corrected number of counts and a forward model for a detector not subject to polarization are used to estimate the object's material composition. In another embodiment of the invention, the correction of the number of counts is performed by using a forward model for a detector subject to polarization to directly estimate the object's material composition.

In an embodiment of the invention, the illumination history comprises a flux of photons previously detected by the photon counting detector in a time interval.

The illumination history can comprise in this embodiment of the invention the flux and an exposure time the detector has been exposed to radiation. The illumination history can further comprise the pulse-height and a timestamp of the detected photons. The pulse-height can be a measure of the number of charge carriers reaching the electrodes of the photon counting detector. The time of the detected photon can comprise a specific time stamp of the photon reaching the detector. In this case, the photon detection unit can be operated in list mode, thereby providing the energy and time of every individual photon. However, the time of the detected photon can comprise a time interval, in which the detector is measuring a specific projection of the computed tomography system. This may lead to a plurality of photons stored with the same detection time in the illumination history. The illumination history can comprise in this embodiment of the invention the signals of a plurality of photons that have been previously detected by the photon counting unit.

By correcting the number of counts in the energy bin, the number of counts is corrected to a value that would have been measured in a detector previously not exposed to irradiation. The correction can take a changed gain of the photon detection unit into account. The reduced gain can be due to space charge effect, polarization effects or charge trapping in the photon detection unit, thereby leading to a pulse-height of the signal that is smaller than it would have been in a photon counting detector previously not exposed to illumination. By correction the gain with the correction value, a reproducible and reliably energy can be assigned to the detected photon, thereby improving the imaging quality of the computed tomography system and reducing imaging artefacts.

In an embodiment of the invention, the determination unit comprises an artificial intelligence module configured for determining the correction value of the gain and/or the correction value of the offset of the photon counting detector based on the illumination history.

The number of counts can be corrected using an artificial intelligence module. The artificial intelligence module can comprise a recurrent neural network (RNN) that is trained to determine the correction value of the gain and/or the offset based on a plurality of training data comprising a known illumination history and a corresponding gain and/or offset of the photon counting detector.

In an embodiment of the invention, the artificial intelligence module is a recurrent neural network configured for being trained to determine the correction value with a dataset comprising a plurality of illumination histories and the corresponding gain and/or offset of the photon counting detector.

The recurrent neural network can be trained in this embodiment of the invention with a sufficient number of training data sets comprising irradiation histories $\Phi i(E, t)$, $t<0$ and corresponding offset and gain responses of the photon counting detector: $Oi(t)$, $Gi(t)$, $t>0$. Illumination histories can be sampled before $t=0$ and offset and gain that are inputs to the training can contain parts of the future, i.e, values for $t>0$. The training data sets can be obtained by phantom scans, thereby leading to a known number of photons impinging onto the detector in a defined time interval. Determination of offsets and gains can be based on measurements or alternatively be deduced from the appearance of deviations from the nominal detector output, i.e. the output of the detector after a long period of non-illumination with a known spectrum. Once the neural network has been trained with a sufficient number of inputs, the neural network can be used to predict the offset and gain provided a given illumination history $(O(t), G(t))=RNN[\Phi(E, t)]$, which can then be used in order to estimate the pulse-height of the signal of the detected photon and therefore the number of counts in every energy bin of the photon detection unit. For successful inference of the polarization state or equivalently the offsets and gains, the entire illumination history of the detector can be taken into account, including detector illumination of calibration scans, clinical scans, tube conditioning, etc.

In an embodiment of the invention, the determination unit is configured for determining the correction value based on a physical model of the photon counting detector taking the illumination history of the photon counting detector into account.

The correction value can be determined by a physical model accounting for the space charge or the charge trapped in the sensor as a function of the illumination history and thereby allows to predict the correction value of the gain and offset. The gain drifts can cause changes in the registered number of counts.

In an embodiment of the invention, the physical model assumes a constant trapping probability of charge carriers generated by the detected photon in the photon counting detector, and an exponential decay of trapped charge carriers over time.

The correction value can be determined based on physical models estimating the decay of polarized offsets and gains using differential equations. In this embodiment an empirical model describing reasonable physical behavior of the offset and gain can be described by analytical means, e.g. the decay of polarized offsets and gains towards nominal values after illumination within certain time constants of a preferably exponential decay. The buildup of polarization and with it offsets and gains can depend on the illumination. Differential equations can be used in this model providing an approach to determine the correction factor. Determining the trapping probability and the de-trapping time constants allows describing a physical model accounting for the state of polarization of the sensor at any given time depending on the history of illumination. The trapping probability of charge carriers can in this embodiment of the invention be considered as constant, thereby leading to an increase of the number of trapped charge carries that is proportional to the photon flux or the amount of energy deposited in the photon counting detector in a defined time interval. The decay of the trapping states can be regarded as an exponential decay with a certain time constant. However, a plurality of different trapping states can be considered in the model, each state decaying with a different time constant.

According to another aspect of the invention, there is provided a computed tomography system comprising the system according to any of the preceding embodiments.

The computed tomography system can comprise the system for correcting a number of counts in an energy bin of X-ray photons detected by a photon counting detector for a spectral computed tomography system, as described in the preceding embodiments, for providing medical images with reduced artifacts due to detector polarization.

According to another aspect of the invention, there is provided a method for correcting a number of counts in an energy bin of X-ray photons detected by a photon counting detector for a spectral computed tomography system. The method comprises the steps of detecting photons and providing a pulse-height of each of the detected photons, and storing a number of counts in an energy bin according to the pulse-height of each of the detected photons. The method comprises further the steps of determining a correction value of a gain and/or a correction value of an offset of the photon counting detector based on an illumination history of the photon counting detector, and correcting the number of counts in the energy bin of the detected photons according to the correction value. The step of correcting the number of counts in the energy bin of the detected photons is performed in a forward model of the spectral computed tomography system by adapting a response function of the photon detection unit according to the correction value of the gain and/or the correction value of the offset of the photon counting detector. Deviations of the number of counts in the energy bin are corrected, which are due to space charge effects, polarization effects of and/or charge trapping in the photon counting detector.

The method according to the invention corrects a number of counts in an energy bin of photons detected by a photon counting detector. In a first step, the photons are detected and the pulse-height of the detected photons is provided. In a second step, the number of counts in an energy bin of the detected photon is stored according to the pulse-height of the detected photons. In a third step, a correction value of a gain and/or an offset of the photon counting detector based on an illumination history is determined. In a fourth step, the number of counts in the energy bin of the detected photons is corrected according to the correction value of the gain and/or the correction value of the offset of the photon counting detector.

The method can be applied to an analysis of patient attenuation coefficients and a material composition of a patient being imaged by a computed tomography system measuring X-ray photons that are into different energy bins according to their measured pulse-height. Thus, the number of counts in one or more energy bins, preferably four or five bins, is used to derive attenuation coefficient and a material composition of a patient to be imaged. The number of counts can be directly corrected in the energy bins. However, the number of counts can also be corrected by providing a forward model for the expectation of the value of the number of X-ray photons detected in the energy bin accounting for the polarization state of the detector. The forward model can comprise a relation of the attenuation coefficient and the material composition with the number of counts in the energy bin and the response function of the photon detection unit. By correction of the pulse-height of the photons in the response function with the correction value of the gain and/or the offset of the photon counting detector, the material composition can be derived by this indirect correction of the number of counts in the energy bins.

In an embodiment of the invention, the step of determining the correction value of the gain and/or the correction of the value of the offset of the photon counting detector based on an illumination history is performed by an artificial intelligence module.

An artificial intelligence module can be used to determine the correction value of the gain and/or the correction value of the offset. The artificial intelligence module can comprise a recurrent neural network that is trained with multiple sets of training data, each comprising an illumination history and a corresponding gain and offset. Alternatively, the set of training data can comprise a correction factor of the gain and/or a correction factor of the offset, which corresponds to the illumination history. Thus, the artificial intelligence module can be trained to determine a correction value of the gain and/or a correction factor of the offset, in case an arbitrary illumination history is provided to the artificial intelligence module.

In an embodiment of the invention, the step of determining the correction value of the gain and/or the correction value of the offset of the photon counting detector based on an illumination history is performed on the basis of a physical model of the photon counting detector taking the illumination history of the photon counting detector into account.

The correction value of the gain and/or the offset can be determined in this embodiment of the invention based on a physical model of the photon counting detector and the physical processes in the photon counting detector. The physical model can be based on the illumination history, taking the flux of photons previously detected by the photon counting detector into account. The physical model can be based on the assumption that the trapping probability of charge carriers is constant, thereby leading to an increase of trapped charge carriers that is proportional to the flux of photons or proportional to the number of free charge carriers generated in the photon counting detector. The number of trapped charge carriers can decrease in this embodiment of the invention in an exponential decay. One or more trapped states with different time constants of decay can be assumed in this model. By determining the number of trapped charge carriers dependent on the illumination history, the space charge can be determined leading to a reduced gain or a changed offset. Therefore, the correction value can be determined which is used to correct the number of counts in an energy bin of the detected photon.

According to another aspect of the invention, there is provided a computer program element, which, when executed on a processing unit, instructs the processing unit to perform the method according to any of the preceding embodiments.

The computer program element can be performed on one or more processing units, which are instructed to perform the method for correcting a number of counts in an energy bin of X-ray photons detected by a photon counting detector for a spectral computed tomography system.

According to another aspect of the invention, there is provided a processing unit configured for executing the computer program element according to the preceding aspect of the invention.

The processing unit can be distributed over one or more different devices executing the computer program element according to the invention.

Thus, the benefits provided by any of the above aspects equally apply to all of the other aspects and vice versa.

In a gist, the invention relates to a system and a method for correcting a number of counts in an energy bin of X-ray photons detected by a photon counting detector for a spectral computed tomography system. An illumination history of the photon counting detector is taken into account to determine a gain and/or an offset of the photon counting detector. The number of counts in an energy bin of detected photons is corrected according to a correction value corresponding to the determined gain and/or offset.

The above aspects and embodiments will become apparent from and be elucidated with reference to the exemplary embodiments described hereinafter. Exemplary embodiments of the invention will be described in the following with reference to the following drawings:

DETAILED DESCRIPTION OF EMBODIMENTS

Figure 1:
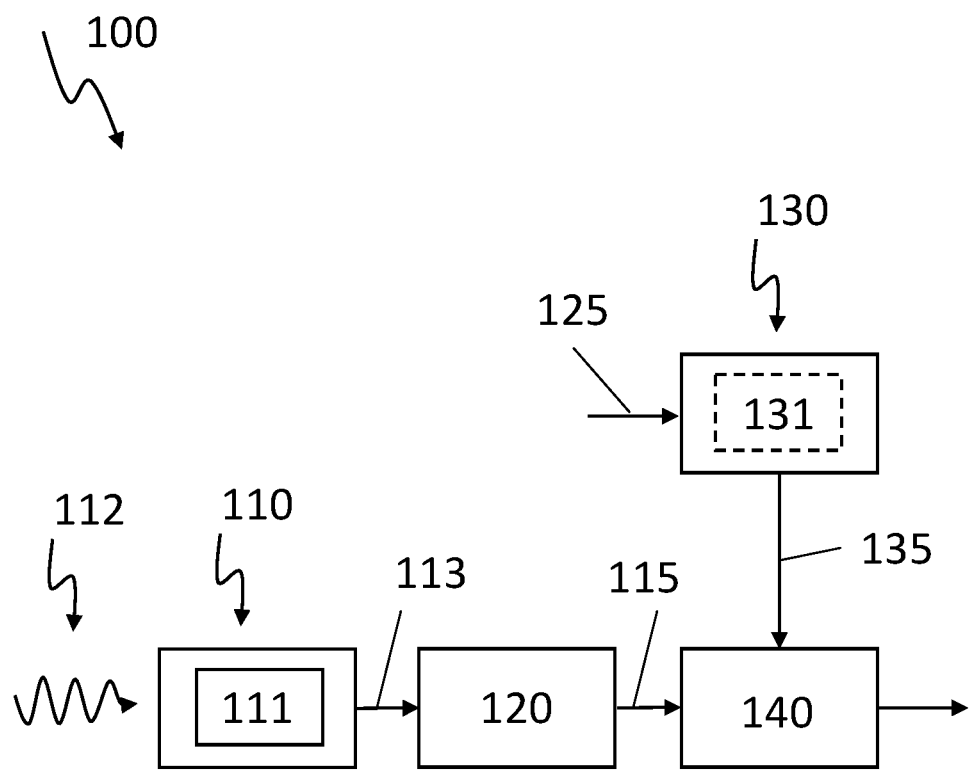
FIG. 1 shows a schematic set-up of a system for correcting a number of counts in an energy bin of X-ray photons detected by a photon counting detector for a spectral computed tomography system according to an embodiment of the invention.

FIG. 1 shows a schematic set-up of a system 100 for correcting a number of counts 115 in an energy bin of X-ray photons 112 detected by a photon counting detector 111 for a spectral computed tomography system 300 according to an embodiment of the invention. A photon 112 incident on the photon counting detector 111 of the photon detection unit 110 is detected by the photon detection unit 110. The photon detection unit 110 provides a pulse-height of the detected photon 112. A storage device 120 is configured for storing a number of counts 115 in an energy bin according to the pulse-height 113 of each of the detected photons 112. An illumination history 125 is provided to the determination unit 130. The determination unit 130 can comprise in embodiments of the invention an artificial intelligence module 131. The determination unit 130 is configured for determining a correction value 135 of the gain or a correction value 135 of the offset of the photon counting detector 111 based on the illumination history 125. The correction factor(s) 135 and the number of counts 115 are provided to the correction unit 140, which is configured for correcting the number of counts 115 in the energy bin of the detected photons 112 according to the correction value(s) 135.

Figure 2:
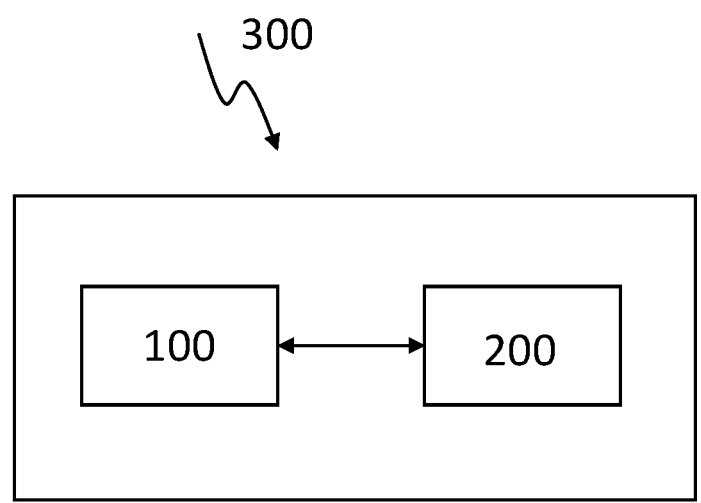
FIG. 2 shows a schematic set-up of a computed tomography system comprising the system for correcting a number of counts in an energy bin of X-ray photons detected by a photon counting detector for a spectral computed tomography system according to an embodiment of the invention.

FIG. 2 shows a schematic set-up of a computed tomography system 300 comprising the system 100 for correcting a number of counts 115 in an energy bin of X-ray photons 112 detected by a photon counting detector 111 for a spectral computed tomography system 300 according to an embodiment of the invention. The computed tomography system 300 further comprises a processing unit 200, which is communicatively connected to the system 100. The processing unit 200 can execute a computer program element that instructs the processing unit 200 to perform the method according to the invention. Therefore, the processing unit 200 can control the system 100 according to the invention. The system 100 can be a part of the computed tomography system 300. The photon counting detector 111 can be a detector of the computed tomography system 300, thereby detecting the X-ray photons of the computed tomography system 300.

Figure 3:
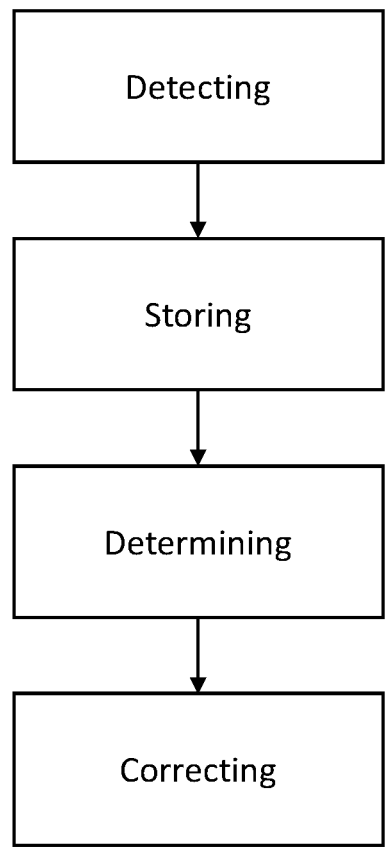
FIG. 3 shows a block diagram of a method for correcting a number of counts in an energy bin of X-ray photons detected by a photon counting detector for a spectral computed tomography system according to an embodiment of the invention.

FIG. 3 shows a block diagram of a method for correcting a number of counts 115 in an energy bin of X-ray photons 112 detected by a photon counting detector 111 for a spectral computed tomography system 300 according to an embodiment of the invention. The method comprises a first step of detecting photons 112 and providing a pulse-height 113 of each of the detected photons. This step is followed by a second step of storing a number of counts 115 in an energy bin according to the pulse-height 113 of each of the detected photons 112. In a third step, a correction value 135 of a gain and/or a correction value 135 of an offset of the photon counting detector 111 is determined based on an illumination history 125 of the photon counting detector 111. In a fourth step, the number of counts 115 in the energy bin of the detected photons 112 is corrected according to the correction value(s) 135.

The physical model for determining the correction value(s) is based on the following assumptions: First, the absence of permanent radiation damage effects. This entails that after a sufficiently long amount of time of non-illumination of the detector, it returns to its normal, non-polarized state resulting in the nominal gain provided before the illumination. Second, the polarization state S(t) determines the output, i.e. the gain and/or the offset of the photon counting detector, at time t. Third, the polarization state S(t) of the photon counting detector is uniquely determined by the illumination history. And fourth, the polarization state S(t) results in changes of offset and/or gain of the photon counting detector.

Assuming that the detector's illumination history is given by the rate spectrum $\Phi(E, t)$, having units of number of photons per energy interval per time interval incident onto the detector at time t. Furthermore, S(t) stands for the state of polarization of the detector at time t. Then the assumptions above can be translated in the mathematical expressions:

1) If $\Phi(E, t)=0$ for $-T<t<0$ and T sufficiently large then $S(0)=S_0$, with $S_0$ denoting the state of an unpolarized detector.
2) $N^b(t)=N^b[\Phi(E, t), S(t)]$, with $N^b(t)$ being the measured number of counts in energy bin b at time t. This is determined by the incident rate spectrum at time t, $\Phi(E, t)$, as well as the state of polarization of the detector at time t, S(t).
3) $S(t)=S[\Phi(E, t'<t)]$. The state of polarization of the detector at time t is a functional of the illumination history.
4) $O[S(\Phi)]$, $G[S(t)]$. Offsets and gains are a function of the polarization state and provide a sufficient description of the polarization state when it comes to an estimate of the expected number of counts in the energy bin b.

The determination of the polarization state S(t) from an illumination history of the photon counting detector is described in 3). This may be described utilizing semiconductor physics, involving mobilities and lifetimes of electrons and holes, densities of impurities, physics of metal semiconductor transitions at the electrodes and many more. The timescales on which these effects take place can have a multitude of physical origins, leading to a physical model. During those timescales however, the nominal count rate or the response to individual photons will be changed with respect to a non-polarized sensor. These deviations in count rate can be corrected, thereby aiming at obtaining a reproducible response of the detector. It works with the insight that the output of the detector at any given moment of its operation is only determined by the incident spectrum, flux and illumination history.

The problem can be considered to be solved in case offset and/or gain can be determined uniquely from the illumination history.

$$N^b(t)=N^b[\Phi(E,t),O(t),G(t)], \qquad \text{Eq. (1)}$$

The equation above states that provided the offset and/or gain are known, the output of the photon counting detector can be predicted for given spectrum rate incident on the detector, provided that pileup is understood. Reliable estimates for photon counts in the respective energy bin can be produced for an arbitrary state of detector polarization, provided that the offsets and gains can be determined uniquely from the illumination history. It can be assumed that only holes are affected by trapping and that one type of traps with de-trapping time $\tau$ exists in the semiconductor material. Then a model for the total trapped positive charge Q(t) can be written as Equation (2):

$$\frac{dQ(t)}{dt} = -\frac{Q(t)}{\tau} + epj(t) \qquad \text{Eq. (2)}$$

where e is the positive value of the elementary charge, p is the probability that a hole generated in the semiconductor material will be trapped prior to reaching the cathode, and j(t) is the generation current of holes. Equation (2) states that the decrease of space charge takes place via de-trapping of trapped holes, and that the buildup of space charge takes place via photon induced e-h (electron-hole) pair generation and a trapping with trapping probability p per hole.

A model for the generation current j(t) can be given for example by Equation (3):

$$j(t) = \frac{1}{\varepsilon}\int_0^\infty E\Phi(E, t)dE \qquad \text{Eq. (3)}$$

where $\varepsilon$ is known to be about 4.5 eV/e-h pair for cadmium zinc telluride as semiconductor material. In another model, non-spectral flux measurements, or likewise more involved alternatives might be put in place of the above Eq. (3).

Eq. (2) can be solved for arbitrary irradiation history j(t). The general solution of the ordinary differential equation can be represented in terms of the inverse Laplace transform $\mathcal{L}^{-1}$ in the following manner:

$$Q(t) = Q(t=0)e^{-\frac{t}{\tau}} + \mathcal{L}^{-1}\left[\frac{\tau ep}{1+s\tau}\tilde{j}(s)\right], \qquad \text{Eq. (4)}$$

with $\tilde{j}(s)$ being the Laplace transform of j(t) defined by:

$$\tilde{j}(s) = \int_0^\infty e^{-st}j(t)dt. \qquad \text{Eq. (5)}$$

$\mathcal{L}^{-1}$ can be obtained either via Mellin's inversion, numerically or by using Fourier space instead of Laplace. Note that the definition of the Laplace transform used here assumes j(t)=0 for negative t. This does not restrict the applicability of the formalism in any way, as all detector irradiations can be considered to happen at positive t.

Experimental observations indicate that a number of different time constants is present. This implies that there are different types or levels of hole trapping. The model can be extended as follows assuming no interaction between different types of traps and neglecting effects of double trapping of holes. This assumption applies as long as all trapping probabilities $p_i$ are small compared to unity. In this case, Eq. (4) is changed to Eq. (6):

$$Q(t) = \sum_i Q^i(t=0)e^{-\frac{t}{\tau_i}} + \mathcal{L}^{-1}\left[\frac{\tau_i e p_i}{1+s\tau_i}\tilde{J}(s)\right]. \qquad \text{Eq. (6)}$$

There is evidence of the existence of several hole trap levels. This is manifested by the different time constants observed in the registered counts and sensor leakage currents, assuming that temperature is kept constant. Short-time stability or Lag, has been shown to have a time constant in the range of 60 ms to 120 ms. Helical scans have also been shown to exhibit transients in the range of a few seconds. Very long acquisitions also show temporal components in the range of hours. Alternative measurements on the settling rate of the dark current also shows components in the range of hours, which are not correlated with temperature variations. All these observations strongly support the concurrent occurrence of hole trapping with distinct time constants.

A model to estimate the charge collected in a detector described by a polarization state characterized by a total trapped charge Q is described by computing the reduction of the electric field or voltage in the semiconductor material in the presence of the charge Q compared to a charge $Q_0$ for the case of the un-polarized sensor. This model gives:

$$K = \frac{U}{U_0} = \frac{(Q_0-Q)/C}{Q_0/C} = 1 - \frac{Q}{Q_0}. \qquad \text{Eq. (7)}$$

As outlined above, the strongest evidence for the origin of banding artifacts was traced back to changes in gain due to polarization. In case polarization changes also the offset of the measured pulse height spectrum, a model for the time dependent offset O(t) as a function of the polarization state of the sensor as described by the total trapped charge at time t would be $$O(t)=O_0+\eta Q(t), \qquad \text{Eq. (8)}$$

with $O_0$ being the offset of the un-polarized sensor and η a constant. As offset effects appear to be less prominent compared to gain effects, the necessity for including non-linear terms in Q(t) appears unlikely. However, also non-linear terms can be taken into account.

In an embodiment of the invention, the number of counts in an energy bin can be described by equation (9).

$$N^b(t) = \int_0^\infty \int_{U_l^b}^{U_h^b} R(E, U)dU \Phi(E, t)dE \qquad \text{Eq. (9)}$$

Here, R(E, U) is the response function. It is the function describing the probability of an X-ray photon interacting in the photon counting detector with incident energy E being detected with pulse-height U. Taking into account the patient attenuation, equation 9 can be written as equation 10:

$$N^b = \int_0^\infty \int_{U_l^b}^{U_h^b} R(E, U)dU \Phi_0(E)e^{-\sum_{i=1}^{3} A^i f(E)^i} dE \qquad \text{Eq. (10)}$$

From this equation, patient attenuation $A^i$ can be inferred from the measured number of counts for the non-polarized case. So the $A^i$ are derived from the measured number of counts $N^b$. Obviously, this fails if the response is changing due to polarization of the photon counting detector and the $A^i$ will become erroneous.

For the case of a polarized sensor, the response function changes according to the following equation 11:

$$R^{pol}(E, U, t) = \frac{1}{K(t)}R\left(E, \frac{1}{K(t)}U - O(t)\right). \qquad \text{Eq. (11)}$$

K(t) and O(t) can be identified with the quantities given in equations Eqs. (7) and (8) above, referring to gain and offset. Eq. (10) above can now be considered as a forward model for the case of a polarized sensor if R(E, U) is being replaced by $R^{pol}$(E, U, t).

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. The mere fact that certain measures are re-cited in mutually different dependent claims does not indicate that a combination of these measures cannot be used to advantage. Any reference signs in the claims should not be construed as limiting the scope.

LIST OF REFERENCE SIGNS

100 system
110 photon detection unit
111 photon counting detector
112 photon
113 pulse-height
115 number of counts
120 storage device
125 illumination history
130 determination unit
131 artificial intelligence module
135 correction value(s)
140 correction unit
200 processing unit
300 computed tomography system

The invention claimed is:

1. A spectral computed tomography system for correcting a number of counts in an energy bin of X-ray photons, the system comprising:

a photon counting detector configured for detecting photons and providing a pulse-height of each of the detected photons;

a storage configured for storing a number of counts in an energy bin according to the pulse-height of each of the detected photons;

at least one processor configured to:
  determine a correction value of a gain and/or a correction value of an offset of the photon counting detector based on an illumination history of the photon counting detector; and
  correct the number of counts in the energy bin of the detected photons according to the correction value of the gain and/or the correction value of the offset of the photon counting detector;
  correct deviations of the number of counts in the energy bin, which are due to space charge effects, polarization effects of and/or charge trapping in the photon counting detector; and
  correct the number of counts in the energy bin of the detected photons by adapting a response function according to the correction value of the gain and/or the correction value of the offset of the photon counting detector.

2. The system according to claim 1, wherein the illumination history comprises a flux of photons previously detected by the photon counting detector in a time interval.

3. The system according to claim 1, further comprising a recurrent neural network configured for being trained to determine the correction value of the gain and/or the correction value of the offset of the photon counting detector with a dataset comprising a plurality of illumination histories and the corresponding gain and/or offset of the photon counting detector.

4. The system according to claim 1, wherein the correction value of the gain and/or the correction value of the offset of the photon counting detector is based on a physical model of the photon counting detector taking the illumination history of the photon counting detector into account.

5. The system according to claim 4, wherein the physical model assumes a constant trapping probability of charge carriers generated by the detected photon in the photon counting detector, and an exponential decay of trapped charge carriers over time.

6. A method for correcting a number of counts in an energy bin of X-ray photons detected by a photon counting detector for a spectral computed tomography system, the method:
  detecting photons and providing a pulse-height of each of the detected photons;
  storing a number of counts in an energy bin according to the pulse-height of each of the detected photons;
  determining a correction value of a gain and/or a correction value of an offset of the photon counting detector based on an illumination history (125) of the photon counting detector;
  correcting the number of counts in the energy bin of the detected photons according to the correction value of the gain and/or the correction value of the offset of the photon counting detector, wherein deviations of the number of counts in the energy bin are corrected, which are due to space charge effects, polarization effects of and/or charge trapping in the photon counting detector; and
  correcting the number of counts in the energy bin of the detected photons by adapting a response function according to the correction value of the gain and/or the correction value of the offset of the photon counting detector.

7. The method according to claim 6, wherein determining the correction value of the gain and/or the correction value of the offset of the photon counting detector based on an illumination history is performed by a trained recurrent neural network.

8. The method according to claim 6, wherein determining the correction value of the gain and/or the correction value of the offset of the photon counting detector based on an illumination history is performed on the basis of a physical model of the photon counting detector taking the illumination history of the photon counting detector into account.

9. A non-transitory computer-readable medium for storing executable instructions, which cause a method to be performed to correct a number of counts in an energy bin of X-ray photons detected by a photon counting detector for a spectral computed tomography system, the method comprising:
  detecting photons and providing a pulse-height of each of the detected photons;
  storing a number of counts in an energy bin according to the pulse-height of each of the detected photons;
  determining a correction value of a gain and/or a correction value of an offset of the photon counting detector based on an illumination history (125) of the photon counting detector;
  correcting the number of counts in the energy bin of the detected photons according to the correction value of the gain and/or the correction value of the offset of the photon counting detector, wherein deviations of the number of counts in the energy bin are corrected, which are due to space charge effects, polarization effects of and/or charge trapping in the photon counting detector; and
  correcting the number of counts in the energy bin of the detected photons by adapting a response function according to the correction value of the gain and/or the correction value of the offset of the photon counting detector.

* * * * *